June 24, 1930.  W. N. BOOTH  1,766,099
DEVICE FOR SECURING WHEEL BODIES TO WHEEL HUBS
Filed Dec. 12, 1927
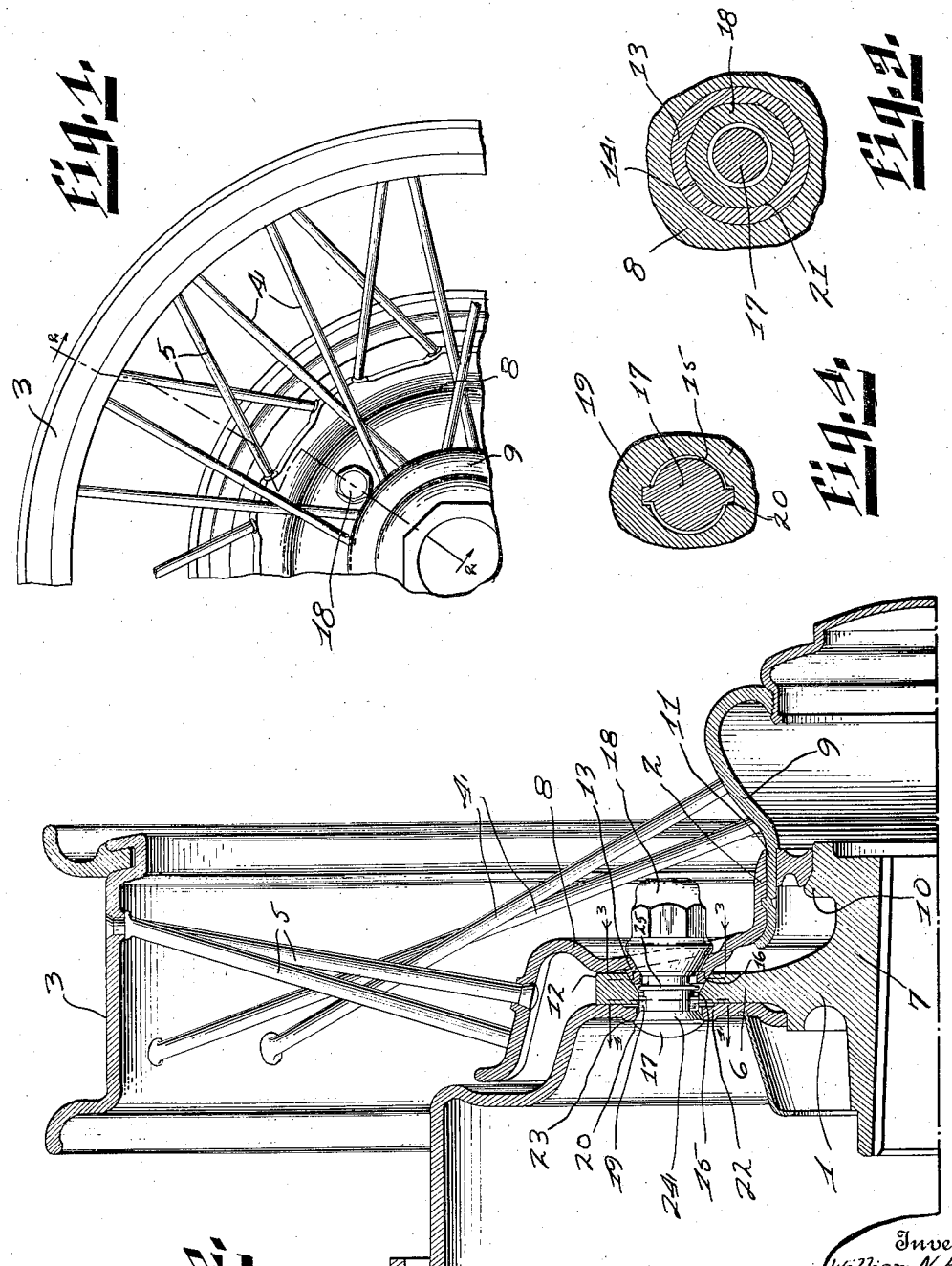
Inventor
William N. Booth Patented June 24, 1930

1,766,099

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

DEVICE FOR SECURING WHEEL BODIES TO WHEEL HUBS

Application filed December 12, 1927. Serial No. 239,564.

The invention relates to vehicle wheels and more particularly refers to the construction for securing a wheel body to a wheel hub. One of the objects of the invention is to so construct the wheel that the wheel body is driven with the wheel hub and the wheel brake drum cooperates with the driving means to normally lock the means for securing the wheel body to the wheel hub. With these as well as other objects in view, the invention resides in the novel features of construction as more fully hereinafter set forth.

In the drawings:—

Figure 1 is a side elevation of a portion of a vehicle wheel embodying my invention;

Figure 2 is a cross section on the line 2—2 of Figure 1;

Figures 3 and 4 are enlarged cross sections on the lines 3—3 and 4—4, respectively, of Figure 2.

The vehicle wheel illustrated in the present instance has the hub 1, the hub shell 2, the rim 3 and the front and rear sets of spokes 4 and 5, respectively, which connect the hub shell and rim and with the same form a wheel body mounted upon the hub. The hub has the fixed radial flange 6, which is preferably integral with its barrel 7 and the hub shell is preferably formed of sheet metal and has the radially extending flange 8 and the barrel 9. The barrel 7 has the annular shoulder 10, while the barrel 9 has rigidly secured thereto the annular spacer 11 which is adapted to engage the shoulder 10 to limit the rearward movement of the hub shell relative to the hub while placing the wheel body upon the hub. The radially extending flange 8 has the annular rib 12 which is adapted to contact with the front face of the radial flange 6 near its outer edge after the spacer has come into contact with the annular shoulder upon the hub.

To drive the wheel body with the hub and also secure the wheel body upon the hub, I have provided the radially extending flange 8 with the series of tubular driving projections 13, which are located radially inward or toward the axis of the wheel from the annular rib 12. Each of these projections is preferably frusto-conical in shape and has an inner cammed face having axially extending cam portions 14, the outer face being plain. I have also formed in the radial flange 6 the transverse openings 15 having enlarged front ends forming recesses 16 for registering with the projections 13. These recesses preferably have tapered circular walls for fitting the outer tapered circular walls of the projections. The projections are preferably so located relative to the annular rib 12 of the hub shell that they come into contact with the radial flange after the annular rib 12 has contacted therewith. Bolts 17 and nuts 18 threaded upon the front ends of the bolts secure the hub shell to the hub. The bolt shanks extend freely through the openings 15 and recesses 16, there being clearance for these shanks to permit limited angular movement of the same relative to the radial flange 6. These bolt shanks are, however, held from turning in the radial flange by means of the fins 19 diametrically opposite each other and extending longitudinally of the bolt shanks engaging in the slots 20 formed in the radial flange. The nuts 18 have frusto-conical or tapered inner ends with cammed faces, these cammed faces having the axially extending cammed portions 21 corresponding to the cam portions 14.

For resiliently providing for movement of the nuts over the projections, I have formed the web 22 of the wheel brake drum with the inwardly or laterally offset portions 23, these offset portions having openings and slots therethrough for registering respectively with the openings 15 and slots 20. The inner ends of the openings are preferably flared for engagement with the flared portions 24 of the bolt heads so that the bolts may more readily move angularly and allow the nuts to find their proper seats upon the projections of the hub shell. The inwardly offset portions 23 being resilient may be sprung sufficiently to allow the cammed portions 21 of the nuts to ride over the cam portions 14 of the projections when rotating the nuts, the arrangement being such that when the nuts are tightened down they are held from accidental disengagement.

For retaining the bolts in the hub, there is the annular fin 25 upon each bolt shank and adapted to engage the inner wall or bottom of the recess 16 through which the bolt shank extends, there being, however, sufficient clearance between the annular fin and the inner wall or bottom to provide for the desired amount of angular movement of the bolt.

From the above description it will be readily seen that I have provided an improved construction of wheel in which the hub shell is driven with the hub and the brake drum resiliently provides for movement of the cammed faces of the clamping nuts over the cammed faces of the hub shell driving projections.

What I claim as my invention is:

1. In a vehicle wheel, in combination, a hub member, a wheel body member, cooperating means upon the hub member and wheel body member for driving the latter with the former, including a tubular projection upon the wheel body member having a cammed face, means for securing the wheel body member to the hub member, including a bolt extending through the projection and a nut upon the bolt having a cammed face engaging the cammed face of the projection, and a brake drum having a web resiliently providing for movement of the nut over the projection and cooperating with the latter to normally lock the former in place and also holding the projection firmly in place.

2. In a vehicle wheel, in combination, a hub member having a radial flange with a recess, a wheel body member having a radially extending portion with a tubular projection extending within the recess, the projection having an inner cammed face, means for securing the wheel body member to the hub member, including a bolt extending through the recess in the radial flange and through the projection, and a nut upon the bolt having a portion extending within the projection and provided with a cammed face engaging the cammed face of the projection, and a brake drum having a web engaging the bolt and resiliently providing for movement of the cammed face of the nut over the cammed face of the projection and cooperating with the projection to normally lock the nut in place and also holding the projection firmly within the recess.

3. In a vehicle wheel, in combination, a hub member, a wheel body member, cooperating means upon the hub member and wheel body member for driving the latter with the former including a tubular projection upon the wheel body member, and means for securing the wheel body member to the hub member with the projection in firm engagement with the hub member and the nut locked upon the bolt, the means including a bolt extending through the projection, a nut upon the bolt engaging the projection, and a brake drum having a resilient web portion.

4. In a vehicle wheel, in combination, a hub member having a radial flange with a recess, a wheel body member having a radially extending portion at one side of the radial flange and provided with a tubular projection extending within the recess, a brake drum having a web at the opposite side of the radial flange and provided with a portion offset laterally from the radial flange, and means for securing the wheel body member to the hub member including a bolt extending through the laterally offset portion of the web through the recess in the radial flange and through the projection, and a nut threaded upon the bolt having a portion extending within the projection, the laterally offset portion of the web being resilient and cooperating with the projection to normally lock the nut upon the bolt and to hold the projection firmly within the recess.

In testimony whereof I affix my signature.

WILLIAM N. BOOTH.